United States Patent
Auer et al.

(10) Patent No.: US 11,260,483 B2
(45) Date of Patent: Mar. 1, 2022

(54) APPARATUS FOR SUPPORTING AT LEAST ONE COMPONENT

(71) Applicant: Bayerische Motoren Werke Aktiengesellschaft, Munich (DE)

(72) Inventors: Christian Auer, Pilsting (DE); Martin Endres, Pfaffenhofen an der Ilm (DE); Franz Korber, Mallersdorf (DE); Georgij Safronov, Reichertshausen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 17/284,819

(22) PCT Filed: Sep. 19, 2019

(86) PCT No.: PCT/EP2019/075159
§ 371 (c)(1),
(2) Date: Apr. 13, 2021

(87) PCT Pub. No.: WO2020/078656
PCT Pub. Date: Apr. 23, 2020

(65) Prior Publication Data
US 2021/0339348 A1    Nov. 4, 2021

(30) Foreign Application Priority Data

Oct. 18, 2018    (DE) .................... 10 2018 125 869.0

(51) Int. Cl.
*B23Q 1/03*    (2006.01)
*B25B 11/00*    (2006.01)
(Continued)

(52) U.S. Cl.
CPC .............. *B23Q 1/035* (2013.01); *B25B 11/00* (2013.01); *B33Y 80/00* (2014.12); *B66F 9/12* (2013.01)

(58) Field of Classification Search
CPC .......... B23Q 1/03; B23Q 1/035; B23Q 1/037; B25B 11/00; B33Y 80/00; B66F 9/12
(Continued)

(56) References Cited

U.S. PATENT DOCUMENTS

2018/0243867 A1    8/2018  Grund

FOREIGN PATENT DOCUMENTS

DE    248 314 A1       8/1987
DE    248314 A    *    8/1987
(Continued)

OTHER PUBLICATIONS

DD248314A—Machine Translation (Year: 1987).*
(Continued)

*Primary Examiner* — Monica S Carter
*Assistant Examiner* — Alberto Saenz
(74) *Attorney, Agent, or Firm* — Crowell & Moring LLP

(57) ABSTRACT

An apparatus for supporting at least one component includes a supporting device having a first and at least one second support element, which are mounted movably relative to each other, and a shape-defining device with a surface contour which fits, at least in some regions, a contour of a supporting section of the component. The supporting device can be placed against the shape-defining device, and, by contact of the at least two support elements with the surface contour of the shape-defining device, the first support element can be moved into a defined position relative to the at least second support element, in which position the at least two support elements reproduce the contour of the supporting section, at least in some regions.

9 Claims, 3 Drawing Sheets

(51) Int. Cl.
*B33Y 80/00* (2015.01)
*B66F 9/12* (2006.01)

(58) Field of Classification Search
USPC .................................. 29/434; 269/266, 269
See application file for complete search history.

(56) References Cited

FOREIGN PATENT DOCUMENTS

| | | |
|---|---|---|
| DE | 103 40 052 A1 | 5/2005 |
| DE | 20 2011 105 207 U1 | 2/2013 |
| DE | 10 2012 017 459 A1 | 3/2014 |
| DE | 10 2013 103 464 B3 | 6/2014 |
| DE | 10 2014 215 001 A1 | 2/2016 |
| DE | 10 2014 215 003 A1 | 2/2016 |
| DE | 20 2015 106 116 U1 | 3/2017 |
| DE | 10 2016 106 417 U1 | 3/2018 |
| DE | 20 2017 104 638 U1 | 12/2018 |

OTHER PUBLICATIONS

International Search Report (PCT/ISA/210) issued in PCT Application No. PCT/EP2019/075159 dated Jan. 14, 2020 with English translation (five (5) pages).
German-language Written Opinion (PCT/ISA/237) issued in PCT Application No. PCT/EP2019/075159 dated Jan. 14, 2020 (six (6) pages).
German-language Search Report issued in German Application No. 10 2018 125 869.0 dated Jul. 29, 2019 with partial English translation (14 pages).

* cited by examiner

APPARATUS FOR SUPPORTING AT LEAST ONE COMPONENT

BACKGROUND AND SUMMARY OF THE INVENTION

The invention relates to an apparatus for supporting at least one component. Here, the component is supported in a supporting region of the apparatus that is adapted, at least in certain regions, to the contoured shape of the component.

Corresponding apparatus for supporting at least one component are known in principle from the prior art. For example, clamping devices are produced that allow a component to be received in a manner adapted to the contoured shape of a component. Here, the component is pressed onto movably mounted clamping pushrods and fixes the clamping pushrods displaced relative to one another thereby with respect to one another in the shape-adapted orientation and thus achieves a shape-adapted clamping surface. A disadvantage here is that, to "set" the shape-adapted clamping surface, a component always has to be placed on at least once.

The object on which the invention is based is to provide an apparatus that allows the provision, in particular in a simple and rapid manner, of an apparatus for supporting a component. Furthermore, it is an object of the invention to increase the degree of automation for supporting a component through the use of the apparatus.

The object is achieved by an apparatus for supporting at least one component according to the independent claim. The claims dependent thereon relate to possible embodiments of the apparatus.

The idea of the invention relates to an apparatus having a supporting device comprising a first and at least one second support element mounted movably with respect to one another, with there further being provided a shape-predetermining device having a surface contour adapted, at least in certain regions, to a contour of a supporting portion of the component. Here, the supporting device can be placed onto the shape-predetermining device, wherein, by contact of the at least two support elements with the surface contour of the shape-predetermining device, the first support element is displaced into a defined relative position in relation to the at least second support element, preferably in relation to all support elements, of the supporting device. In this defined relative position, the at least two support elements reproduce the contour of the supporting portion, at least in certain regions, and, at their ends facing the component, a supporting region. This makes it possible for an apparatus for supporting at least one component to be provided that, through the use of a shape-predetermining device—which is not the component itself—, carries out the adaptation of a supporting device as is necessary for supporting a component in a contour-adapted manner. The adaptation of the supporting device therefore does not require a component. The apparatus can be used for supporting at least one component in a manufacturing, transporting, processing or storage installation.

A conversion of the supporting device from the application for a first component having a first contour of a supporting portion to a second component having a contour of the supporting portion differing from the first contour can be carried out in a simple, rapid and reliable manner, also because the conversion itself does not require a corresponding component to be provided. A further advantage of the apparatus according to the invention can be seen in the fact that automated gripping and/or depositing of the component by a robot are/is positively influenced or assisted by a predefined positioning of the component on the supporting device that is accurate in terms of position and/or orientation. The support elements can have a rectilinear or a curved profile along their center longitudinal axes. The support elements can have a front end facing the component to be supported and, opposite this end, a rear end facing the shape-predetermining device. The at least one support element can preferably be of hardened design in part, for example at least at the front end. For example, the front end could consist of hardened steel. This makes it possible to avoid or reduce ageing or sites of wear possibly occurring as a result of friction caused by frequently changing contact with the components to be supported. It is also possible for at least the front end to have a rounded design. Furthermore, a damping element can interact with the support elements such that any impact is damped when the support elements are acted upon as a result of a component being deposited, and hence any risk of wear and/or risk of unintended deformation of a component while being deposited are/is reduced or avoided.

In a preferred embodiment, the supporting device comprises a, preferably plate-shaped, carrier element, wherein the supporting elements are movably mounted in or on the carrier element. Integrating or fastening the support elements within a carrier element makes it possible for the handling of the support elements to be improved. For example, by replacing a first carrier element by a second carrier element, a first group of support elements can be replaced with a second group of support elements in a simple manner. Finally, the carrier element forms the possibility of performing, or at least in part assisting, the bearing function for relative movability of the support elements among one another, with the result that the support elements themselves, on account of this integration of the bearing function in the carrier element, can be produced in a simpler manner and at lower costs. It is also possible for the handling of the apparatus to be advantageously influenced if the support elements are movably fastened to the carrier element in a captive manner, that is to say, for example, that the support elements are movably connected to the carrier element in a nonreleasable manner, that is to say cannot be released without destruction. For this purpose, widenings can be provided at the end regions of the support elements that allow movement exclusively within the widenings or within the stops. The support elements can be arranged within the carrier elements in a regular or irregular manner. At least one group of support elements of a supporting device preferably has a uniform length. Finally, all support elements of a supporting device can also be designed with an equal length.

In particular, the bearing of the support elements in a carrier element affords the advantageous possibility that at least one support element can be displaced in a direction extending perpendicular to the main plane of extent of the carrier element, with preferably the at least two support elements being displaceable along movement lines oriented parallel to one another. It is also possible for all support elements arranged movably in a carrier element to be displaceable along movement lines oriented parallel to one another. The movement lines can be curved or preferably have a rectilinear profile.

Furthermore, there can be provision that the supporting device, preferably the carrier element, can be supported, at least in certain regions, via at least one support means on the shape-predetermining device and/or on a receptacle which receives the shape-predetermining device. The support means is thus to be distinguished from the support element.

The support means can be arranged on the carrier plate in a releasable or nonreleasable manner. Alternatively or additionally, the support means can be fastened to the shape-predetermining device and/or to the receptacle in a releasable or nonreleasable manner. For example, the shape-predetermining device can have within its surface contour a region which is in contact with the carrier element and thus allows direct support between the carrier element and the shape-predetermining device without at the same time a support element being "interconnected". In other words, there can be a direct contact of the carrier element with the shape-predetermining device to form a support means for supporting the carrier element on the shape-predetermining device. The receptacle can be either a stationary, that is to say a locally nondisplaceable receptacle or a locally unbound or movable receptacle. In particular, the locally unbound or movable receptacle can form at least one part of a floor transport system (FTS) or of a floor transport vehicle (FTV), with the result that the apparatus for supporting at least one component can be displaced, preferably in an automated manner. It is possible here by means of the apparatus to achieve secure transport of a component mounted on a receptacle in a defined manner in terms of position. Particularly for the transport of, for example deep-drawn, sheet metal parts having a small wall thickness and/or relatively complex geometries, secure transport can thus be achieved without negative effects on the sheet metal part resulting from any accelerations and from the intrinsic weight of the sheet metal part. For example, the apparatus according to the invention makes it possible to provide a shape-accurate bearing possibility for components in vehicle body construction, in particular for components which are unstable on account of their size and their small wall thicknesses.

In a further, advantageous embodiment of the invention, the supporting device, preferably the carrier element, can be guided, at least in certain regions, via at least one guide means while being placed onto the shape-predetermining device. Here, the guide means can be arranged on the shape-predetermining device and/or on a receptacle which receives the shape-predetermining device. The guide means here is none of the support elements but a separate structural element or a support element that does not act as a support element, that is to say a support element which, for the present component, is not used to reproduce the contour of the supporting portion or not used to form the supporting region. The guide means can be fastened to the receptacle, to the shape-predetermining device and/or to the supporting device, in particular to the carrier element, in a releasable or nonreleasable manner. The guide means here is preferably designed in such a way that, on the one hand, it is provided as an engagement element region or bearing element region on a first contact partner and interacts with a corresponding counter-element region in order, while the supporting device and shape-predetermining device are being brought together, to achieve a centering or a defined end-positioning relative-positioning and/or end-positioning relative-orienting feed movement. In a particularly preferred embodiment of the invention, the support means and the guide means are formed as one and the same element, that is to say an element can be provided that possesses both the function of the support means and the function of the guide means.

Furthermore, there can be provision that at least one support element, in particular at least two support elements or all support elements, of a supporting device can be arrested by an arresting device in their relative position in relation to one another and/or in relation to the carrier element. This ensures that the positioning of the shape-predetermining device is necessary only during the "setting" of the supporting device to the contoured shape of the supporting portion of the component and that thereafter the further supporting function of the supporting device can be carried out even without the provision of the shape-predetermining device. Preferably if the supporting device, in particular the carrier element, can be supported on a receptacle via support means, the advantage can be achieved that an apparatus for supporting a component is created which, by virtue of the support elements being arrested with respect to one another, performs the supporting function for the component even without a shape-predetermining device being permanently provided in the apparatus.

The shape-predetermining device can be manufactured in an additive manufacturing method, such as for example from an additive manufacturing method using a metal and/or plastic (in particular synthetic resin) as building material. For example, at least one of the following additive manufacturing methods can be used: fused deposition modeling (FDM/FFF), stereolithography (SLA), digital light processing (DLP), selective laser sintering (SLS), selective (metal) laser melting (SLM) or jetting methods (multijet fusion, HSS). An additive manufacturing method is particularly appropriate for the production of the shape-predetermining device, since it is with this method that a defined surface contour can be achieved in a simple, exact and cost-effective manner. The economic efficiency of a shape-predetermining device produced in such a way can be further increased by the shape-predetermining device having cavities which are preferably arranged below a closed surface contour shape, and being equipped with a support structure (grid structure, column structure). Particularly if the shape-predetermining devices are formed from plastic, the advantage is afforded whereby they are lightweight and therefore not only can they be stored in racks but also handling thereof by a worker and/or a robot is facilitated.

Alternatively or additionally, at least one part of the shape-predetermining device can consist of a plurality of joined-together, preferably plate-like, individual elements. These individual elements can be produced by primary forming or by forming manufacturing methods (for example from stamped sheet metal parts). In the case of plate-like and joined-together individual elements for forming the shape-predetermining device, it is advantageous if the main planes of extent of the elements oriented parallel to one another extend substantially perpendicular to the contour of the supporting portion, that is to say in other words that the plates in their main plane of extent are oriented parallel to the movement direction of the bringing-together movement and/or parallel to the movement lines of the supporting device or of the carrier elements. The plate-like elements can be connected to one another in a form-fitting and/or force-fitting manner, with in particular the plate-like elements being screwed together, adhesively bonded together or welded together.

Particularly when a supporting device is used for different components having differently configured supporting portions, it is advantageous if the different shape-predetermining devices are used and they are each equipped with markings. In other words, a first shape-predetermining device has a first marking and a second shape-predetermining device has a second marking differing from the first marking, wherein the second shape-predetermining device has a surface contour differing from the first shape-predetermining device. The two markings make it possible to distinctly and clearly indicate which component or which components the respective shape-predetermining device is suitable for. This facilitates the handling of the apparatus according to the invention for supporting at least one component, since the risk of confusion is reduced. Particularly when a reading device is provided that makes it possible in an automated manner to detect a marking, preferably identification information specific to the shape-predetermining device, of a shape-predetermining device, the degree of automation and/or the frequency of incorrect operations in connection with the apparatus for supporting a component are/is positively influenced.

The apparatus for supporting at least one component can be the component support of a measuring or processing device. It can also be a component carrier of a transport device that receives a component in a defined orientation and by means of which the component is transported between two locations, in particular to or from a machine.

In addition to the apparatus for supporting a component, the idea of the invention also embraces a method for supporting a component using an apparatus as described above, characterized by the following method steps: (a) placing the supporting device onto a shape-predetermining device, wherein, by contact of the at least two support elements with the surface contour of the shape-predetermining device, the first support element is displaced into a defined relative position in relation to the at least second support element, and the at least two support elements reproduce the contour of the supporting portion, at least in certain regions, (b) placing a component onto a supporting device. The supporting device can form, with a receptacle and possibly together with a shape-predetermining device, a transport assembly for transporting a component from a first location to a second location. If the supporting device is supported with the receptacle via support means and arresting of the support elements of the supporting device can be carried out, it is possible to dispense with the provision of the shape-predetermining device within the transport assembly. If, however, arresting of the support elements cannot be carried out, the shape-predetermining device forms a necessary constituent part of the transport assembly, since the shape-predetermining device is necessary for the formation, by the front ends of the support elements that face the component, of the surface contour adapted to the supporting portion.

All the advantages, details, configurations and/or features of the apparatus according to the invention and embodiments and specific forms thereof can also be transposed or applied to the arrangement according to the invention and the method according to the invention.

The invention is explained in more detail on the basis of exemplary embodiments in the drawings.

DETAILED DESCRIPTION OF THE DRAWINGS

Figure 1A:
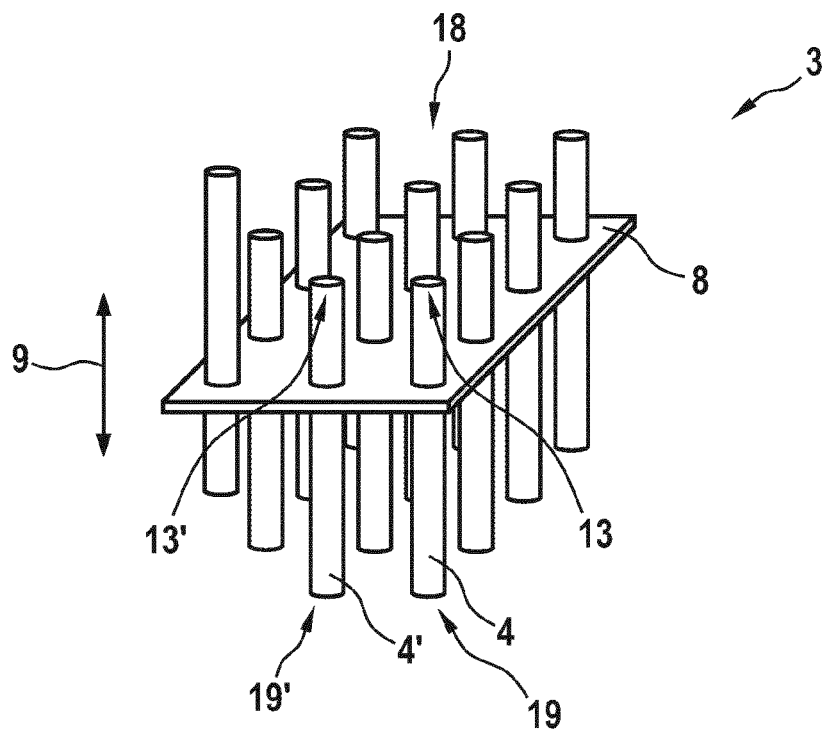
FIG. 1a is a schematic illustration of a supporting device.
Figure 1B:
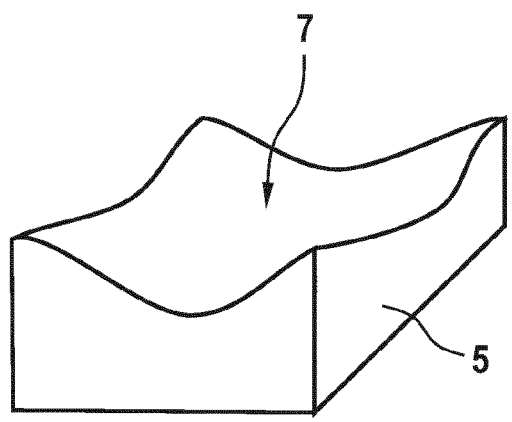
FIG. 1b is a schematic illustration of a shape-predetermining device.
Figure 1C:
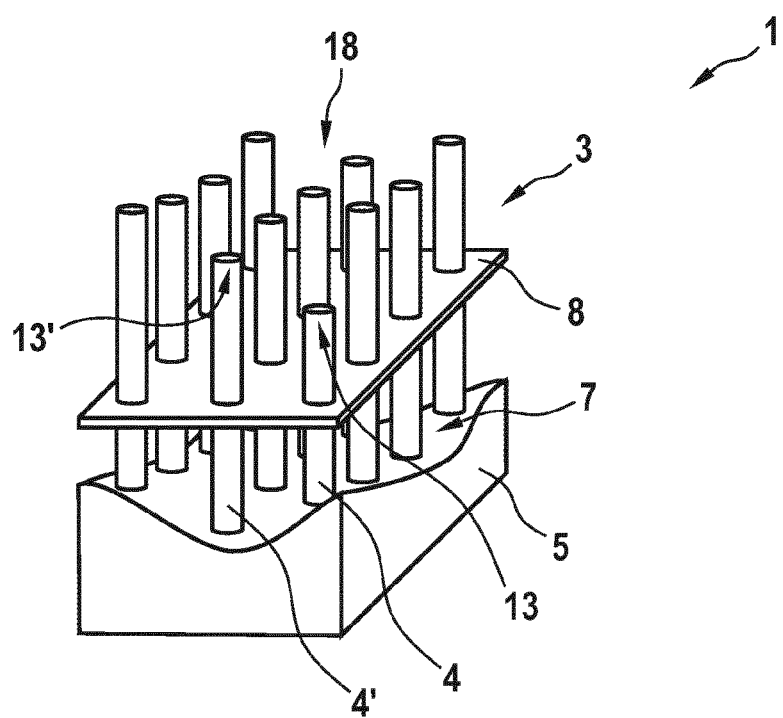
FIG. 1c is a schematic illustration of a supporting device placed on a shape-predetermining device.
Figure 2:
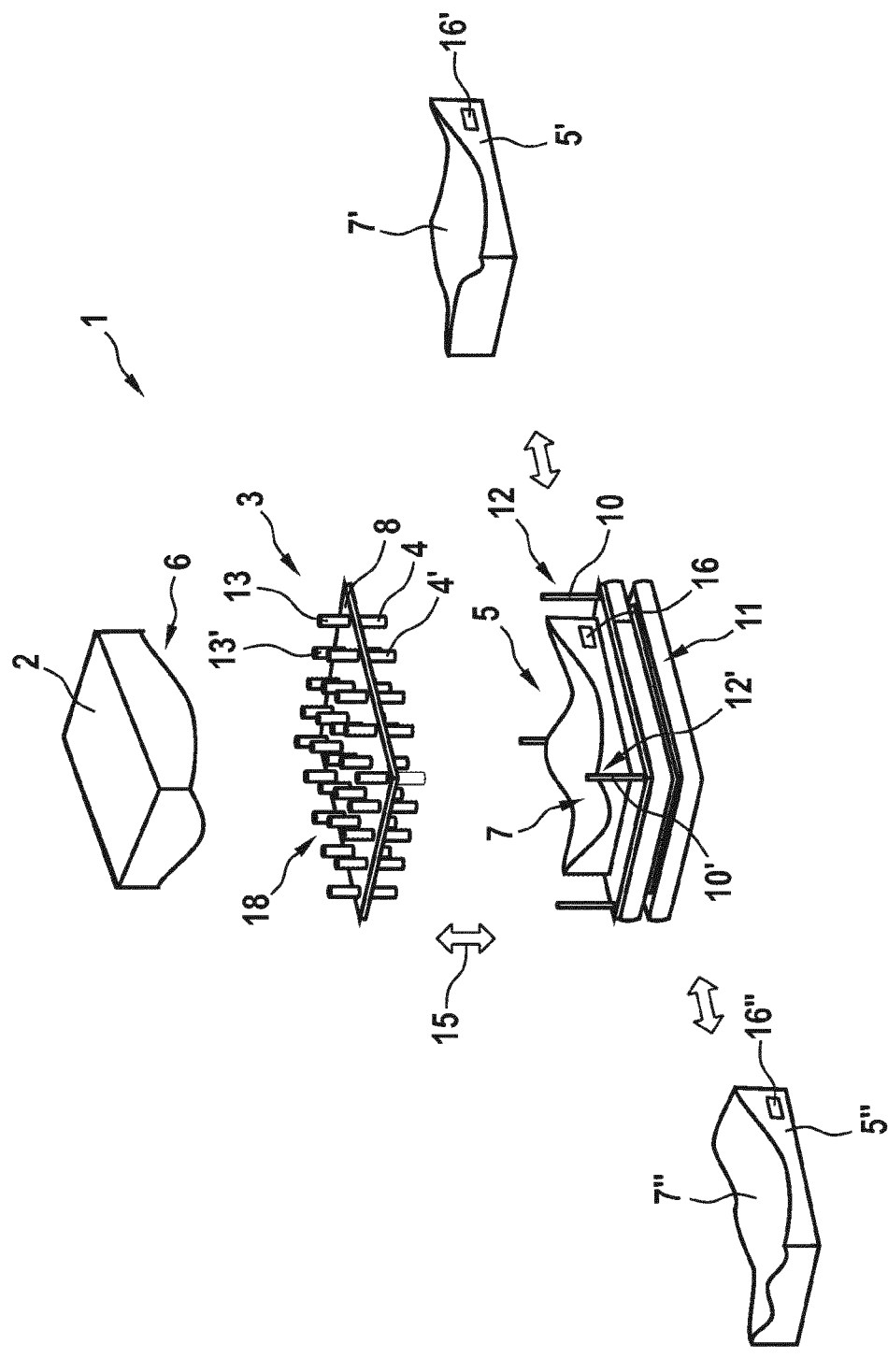
FIG. 2 is a schematic illustration of a plurality of shape-predetermining devices which can be alternately placed on a receptacle.

FIG. 1c shows a basic illustration of an apparatus 1 for supporting at least one component 2, wherein the apparatus 1 has a supporting device 3 comprising a first and at least one second support element 4, 4' mounted movably with respect to one another, and has a shape-predetermining device 5 having a surface contour 7 adapted, at least in certain regions, to a contour of a supporting portion 6 of the component 2 (see FIG. 2). The supporting device 3 can be placed onto the shape-predetermining device 5, wherein, by contact of the at least two support elements 4, 4' with the surface contour 7 of the shape-predetermining device 5, the first support element 4 is displaced into a defined relative position in relation to the at least second support element 4', in which position the at least two support elements 4, 4' reproduce the contour of the supporting portion 6, at least in certain regions. The supporting device 3 has a plate-shaped carrier element 8 in or on which the support elements 4, 4' are mounted so as to be movable along and parallel to the arrow 9 and hence along and parallel to a rectilinear movement line, cf. FIG. 1a. Here, the support elements 4, 4' can be displaced perpendicular to the main plane of extent of the carrier element 8, wherein all support elements 4, 4' of a supporting device 3 can be displaced along movement lines oriented parallel to one another.

Figure 1D:
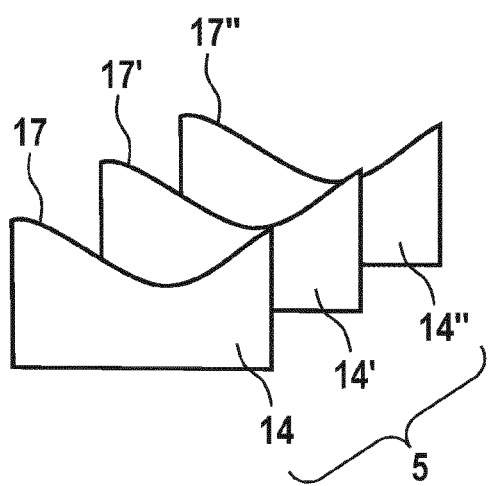
FIG. 1d shows a schematic illustration of an alternative embodiment of a shape-predetermining device.

The shape-predetermining device 5 can be produced from an additive manufacturing method. Alternatively or additionally, the shape-predetermining device 5 can consist at least in part of a plurality of joined-together, preferably plate-like, individual elements 14, 14', 14", cf. FIG. 1d. The surface contour 7, which is adapted to or corresponds to the supporting portion 6 of the component 2, of the shape-predetermining device 5 can thus also be achieved by a plurality of individual elements 14, 14', 14" having different surface contour portions 17, 17', 17" and by these surface contour portions 17, 17', 17", in the assembled state of the individual elements 14, 14', 14", forming the surface contour 7 of the shape-predetermining device 5. These individual elements 14, 14', 14" can be produced either from an additive manufacturing method or in a forming or primary forming manufacturing method, such as for example in a casting or sheet metal forming method.

As can be seen from FIG. 2, the supporting device 3 and hence the carrier element 8 can be supported via support means 10, 10' on a receptacle 11 which receives the shape-predetermining device 5 and hence also with respect to the shape-predetermining device 5. In the illustrated embodiment, the support means 10, 10' are arranged in the end regions and perpendicular to the receptacle 11. At the same time, in the illustrated embodiment, the supporting device 3 and hence also the carrier element 8 can be guided, in certain regions, via at least one guide means 12, 12' while being placed onto the shape-predetermining device 5, that is to say, during the placement of the supporting device 3 via the guide means 12, 12', a defined orientation and/or positioning of the supporting device 3 relative to the shape-predetermining device 5 and relative to the receptacle 11 can be carried out. In the present case, the support means 10, 10' and the guide means 12, 12' are realized in one and the same element.

It can also be seen from FIG. 2 that, by way of example, three different shape-predetermining devices 5, 5', 5" having different surface contours 7, 7', 7" can be used for different components 2 or for components 2 having differently formed supporting portions 6. In order to exchange a shape-predetermining device 5, 5', 5", the supporting device 3 can be lifted off upward from the first shape-predetermining device 5 along the arrow 15. The shape-predetermining device 5 can then be exchanged by removal and insertion of a second shape-predetermining device 5' or a third shape-predetermining device 5". It is thus possible by way of only one supporting device 3 and a corresponding number of shape-predetermining devices 5, 5', 5" to achieve an apparatus 1 for supporting a large number of different components 2 and/or a means of supporting a large number of different supporting regions 6 of at least one component 2. Thus, the start-up costs for an apparatus 1 for supporting components are reduced. The shape-predetermining devices 5, 5', 5" also require little space for storage, that is to say the apparatus for supporting one or more different components 2 requires overall a small space volume for storage thereof.

It is advantageous if the shape-predetermining devices 5, 5', 5" each have a marking 16, 16', 16" and hence a confusion-proof differentiation between the shape-predetermining devices 5, 5', 5" can be carried out by taking the markings 16, 16', 16" into consideration. There can also be provision that the apparatus 1 has a reading device (not shown) which can preferably detect a marking 16, 16', 16" of a shape-predetermining device 5, 5', 5" in an automated manner. The reading device can detect shape-predetermining device-specific identification information of the respective shape-predetermining devices 5, 5', 5". The lifting of the supporting device 3, the removal of the shape-predetermining device 5, the insertion of the shape-predetermining device 5', 5", the placement of the supporting device 3 onto the shape-predetermining device 5, 5', 5", the movement of the receptacle 11 and/or the reading of the marking 16, 16', 16" can preferably be carried out in an automated manner, with, for example, recourse being had to robots or manipulators for this purpose. A mechanism (not shown) can also be arranged on or in the receptacle 11 that allows lifting and/or placement of the supporting device 3 onto a shape-predetermining device 5, 5', 5" and/or onto a receptacle 11.

FIG. 1c illustrates how a supporting device 3 has been placed on the shape-predetermining device 5 and how the individual support elements 4, 4', which are each identical in their length, are positioned relative to one another and relative to the carrier element 8 on account of the surface contour 7 of the shape-predetermining device 5. Upon placing the supporting device 3 onto the shape-predetermining device 5, contact between the at least two support elements 4, 4' and the surface contour 7 causes the first support element 4 to be displaced into a defined relative position in relation to the at least second support element 4', with the result that the at least two support elements 4, 4' reproduce the contour of the supporting portion 6 of the component 2, at least in certain regions. The support elements 4, 4' have front ends 13, 13' facing the component 2 and rear ends 19, 19' facing the shape-predetermining device 5. Here, the supporting region 18 is formed by the front ends 13, 13' of the support elements 4, 4'. The supporting portion 18 corresponds to the supporting portion 6 of the component 2 and thus forms, at least in certain regions, a supporting portion-specific point and/or areal support for the component 2 that is adapted to the supporting portion 6.

The apparatus 1 can further comprise an arresting device (not shown), with it being possible by means of the arresting device for the support elements 4, 4' to be arrested at least temporarily in their relative position in relation to one another.

What is claimed is:

1. An apparatus for supporting a component, comprising:
   a supporting device comprising a first and at least one second support element mounted movably with respect to one another; and
   a shape-predetermining device having a surface contour adapted, at least in certain regions, to a contour of a supporting portion of the component,
   wherein
   the supporting device is placeable onto the shape-predetermining device and, by contact of the first and at least one second support element with the surface contour of the shape-predetermining device, the first support element is displaced into a defined relative position in relation to the at least second support element, in which position the two support elements reproduce the contour of the supporting portion, at least in certain regions,
   the shape-predetermining device has a marking, with a first shape-predetermining device having a first marking and a second shape-predetermining device having a second marking differing from the first marking, and
   the second shape-predetermining device has a surface contour differing from the first shape-predetermining device;
   a reading device that detects the marking of the shape-predetermining device in an automated manner, with identification information specific to the shape-predetermining device being detectable by the reading device.

2. The apparatus according to claim 1, wherein
   the supporting device comprises a plate-shaped carrier element, and
   the support elements are movably mounted in or on the carrier element.

3. The apparatus according to claim 2, wherein
   at least one support element is displaceable in a direction extending perpendicular to a main plane of extent of the carrier element, with the at least two support elements being displaceable along movement lines oriented parallel to one another.

4. The apparatus according to claim 2, wherein
   the carrier element is supported, at least in certain regions, via at least one support structure on the shape-predetermining device and/or on a receptacle which receives the shape-predetermining device.

5. The apparatus according to claim 2, wherein
   the carrier element is guided, at least in certain regions, via at least one guide while being placed onto the shape-predetermining device, with the guide being arranged on the shape-predetermining device and/or on a receptacle which receives the shape-predetermining device.

6. The apparatus according to claim 1, wherein
   at least two support elements are fixable in relative position in relation to at least one support element and/or in relation to the carrier element.

7. The apparatus according to claim 1, wherein
   the shape-predetermining device is additively manufactured.

8. The apparatus according to claim 1, wherein
   the shape-predetermining device comprises a plurality of joined-together, plate-shaped, individual elements.

9. A method for supporting a component, using an apparatus comprising a supporting device with a first and at least one second support element mounted movably with respect to one another, and comprising a shape-predetermining device having a surface contour adapted, at least in certain regions, to a contour of a supporting portion of the component,
   the method comprising the steps of:

placing the supporting device onto the shape-predetermining device, wherein, by contact of the at least two support elements with the surface contour of the shape-predetermining device, the first support element is displaced into a defined relative position in relation to the at least second support element, and the at least two support elements reproduce the contour of the supporting portion, at least in certain regions; and placing the component onto the supporting device, wherein the shape-predetermining device has a marking, with a first shape-predetermining device having a first marking and a second shape-predetermining device having a second marking differing from the first marking, and the second shape-predetermining device has a surface contour differing from the first shape-predetermining device, the method further comprising:

detecting, via a reading device, the marking of the shape-predetermining device in an automated manner, with identification information specific to the shape-predetermining device being detectable by the reading device.

\* \* \* \* \*